United States Patent
Wollum et al.

(10) Patent No.: US 6,359,075 B1
(45) Date of Patent: Mar. 19, 2002

(54) MEANS OF PRODUCING HIGH DIBLOCK CONTENT THERMOPLASTIC ELASTOMERS VIA CHAIN TRANSFER

(75) Inventors: Mark H. Wollum, Norton; Daniel F. Graves, Canal Fulton, both of OH (US)

(73) Assignee: Bridgestone/Firestone, Inc., Akron, OH (US)

( * ) Notice: Subject to any disclaimer, the term of this patent is extended or adjusted under 35 U.S.C. 154(b) by 0 days.

(21) Appl. No.: 09/757,141

(22) Filed: Jan. 9, 2001

(51) Int. Cl.⁷ .................. C08F 297/02; C08F 297/04
(52) U.S. Cl. .................. 525/314; 525/180; 525/340
(58) Field of Search .................. 525/314; 526/180, 526/340

(56) References Cited

U.S. PATENT DOCUMENTS

| | | |
|---|---|---|
| 3,646,161 A | 2/1972 | Marwede et al. |
| 4,212,910 A | 7/1980 | Taylor et al. |
| 4,250,273 A | 2/1981 | Bohm et al. |
| 4,265,977 A | 5/1981 | Kawamura et al. |
| 4,291,139 A | 9/1981 | Halasa et al. |
| 4,332,858 A | 6/1982 | Saitoh et al. |
| 4,383,071 A | 5/1983 | Lawson et al. |
| 4,454,280 A | 6/1984 | Lawson |
| 4,607,089 A | 8/1986 | Riley et al. |
| 4,704,110 A | 11/1987 | Raykovitz et al. |
| 4,712,808 A | 12/1987 | Beh-Forrest et al. |
| 4,722,650 A | 2/1988 | Allen et al. |
| 4,755,545 A | 7/1988 | Lalwani |
| 4,889,884 A | 12/1989 | Dust et al. |
| 4,942,195 A | 7/1990 | Flanagan et al. |
| 4,997,709 A | 3/1991 | Huddleston et al. |
| 5,194,539 A | 3/1993 | Charmot et al. |
| 5,284,915 A | 2/1994 | Custro et al. |
| 5,296,540 A | 3/1994 | Akiyama et al. |
| 5,304,598 A | 4/1994 | Custro et al. |
| 5,356,963 A | 10/1994 | Kauffman et al. |
| 5,369,175 A | 11/1994 | Hoximeier et al. |
| 5,405,903 A | 4/1995 | Van Westrenen et al. |
| 5,416,210 A | 5/1995 | Sherba et al. |
| 5,451,621 A | 9/1995 | Usmani et al. |
| 5,795,985 A | 8/1998 | Hüsler et al. |
| 5,932,662 A | 8/1999 | Lawson et al. |
| 5,948,810 A | 9/1999 | Wessel et al. |
| 6,008,295 A | 12/1999 | Takeichi et al. |
| 6,075,092 A | 6/2000 | Nakamura et al. |
| 6,080,835 A | 6/2000 | Lawson et al. |
| 6,084,025 A | 7/2000 | Kitamura et al. |

OTHER PUBLICATIONS

*Adhesives Age*, Nov., 1997, D.F. Graves et al.

Primary Examiner—Jeffrey C. Mullis
(74) Attorney, Agent, or Firm—David G. Burleson; Ann Skerry

(57) ABSTRACT

A process of preparing a diblock/triblock composition in a single reaction vessel includes reacting a first monomer, such as styrene, with a first portion of an anionic catalyst in a suitable solvent to form a first polymer block of the triblock. A second step includes adding a second portion of the catalyst and a second monomer, such as butadiene (when the first monomer is styrene). A portion of the resulting living diblock polymer is then terminated by addition of a chain transfer agent, which forms a second anionic catalyst in the process. Further sequential additions of the second and first monomers copolymerize with both the remaining living diblock and with the second anionic catalyst to complete the triblock polymer and form a second portion of diblock polymer.

20 Claims, No Drawings

MEANS OF PRODUCING HIGH DIBLOCK CONTENT THERMOPLASTIC ELASTOMERS VIA CHAIN TRANSFER

FIELD OF THE INVENTION

The present invention relates generally to polymerizations, specifically to a method for preparing a combination of di-block and tri-block copolymers in a single reaction vessel, and will be described with particular application thereto.

BACKGROUND OF THE INVENTION

Blends of styrene-butadiene diblock and styrene-butadiene-styrene tri-block interpolymers have a variety of applications. In an adhesive composition, the diblock polymer provides tack, while the triblock polymer provides the composition with its elastomeric properties. One process for preparing such a composition is to physically blend the tri block and the diblock copolymers which have been prepared independently. However, such a process requires a large blending capacity and is therefore undesired. Moreover, it will be appreciated that the separate preparation of the diene diblock and triblock copolymers makes the control of the composition of the mixture extremely difficult. Better adhesive properties result by having identical molecular weights of the styrene blocks in the diblock and triblock polymers. When blending a triblock with a diblock interpolymer, it is difficult, if not impossible to achieve this optimal ratio.

Another method of forming diblock triblock compositions involves partial coupling of live diblock species. Suitable coupling agents include reactive halogen compounds, such as, for example, dimethyl dichlorosilane, silicon tetrachloride, methylene bromide, phosphorus trichloride, or divinyl benzene. This method can achieve matching of the polystyrene molecular weights in the diblock and elastomer, if a solvent is used in which the polystyrene is completely soluble. If the polystyrene is insoluble in the solvent (for example, hexane), the polystyrene maximum molecular weight is limited. For acceptable adhesive properties, it is desirable to exceed this maximum molecular weight.

Another method of forming diblock/triblock compositions is by using a multiple catalyst charge and by staggered addition of the monomers and deactivation of a portion of the growing polymer chains before or during addition of a subsequent monomer. For example, a high diblock TPE can be formed by charging a lithium catalyst with styrene and allowing polymerization, followed by further addition of the catalyst and butadiene. Once this has polymerized, a further charge of styrene is added. The resulting compositions, however, exhibit poor adhesion to stainless steel and polypropylene, and have low cohesive tensile strength.

The present invention provides a new and improved block copolymer blend, process of forming, and an adhesive composition incorporating block copolymer blend, which overcomes the above-referenced problems and others.

SUMMARY OF THE INVENTION

Briefly, the present invention provides a process for preparing a polymer composition which includes diblock and triblock copolymers. The process includes polymerizing vinyl aromatic monomer in an inert hydrocarbon solvent in the presence of a first anionic catalyst system until substantially complete conversion to a living vinyl aromatic polymer has occurred. A conjugated diene monomer is added and allowed to copolymerize with the living vinyl aromatic polymer to form a living diblock polymer including a first block which is substantially of the first vinyl aromatic polymer and a second block which is substantially of a conjugated diene polymer. A chain transfer agent is added, which terminates at least a portion of the living diblock polymer and forms a second anionic catalyst system. A conjugated diene monomer is added and allowed to copolymerize with the unterminated living portion of the diblock polymer and self polymerize with the second anionic catalyst to form a living conjugated diene polymer. A vinyl aromatic monomer is then added, and allowed to copolymerize with the living polymers to form the diblock and triblock copolymers.

In another aspect, a process of forming a composition which includes a diblock polymer and a triblock polymer is provided. The process includes polymerizing a first monomer in a suitable solvent in the presence of a first anionic catalyst system then adding a second monomer and allowing copolymerization with the first monomer to form a living diblock polymer. A chain transfer agent is added in sufficient amount to terminate only a portion of the living diblock polymer to form the diblock polymer and form a second anionic catalyst system capable of catalyzing polymerization of the second monomer. A second portion of the second monomer is added and allowed to copolymerize with the living diblock polymer and with the second ionic catalyst system. A second portion of the first monomer is then added to form the triblock polymer.

In other aspects, the invention provides a polymer composition and an adhesive composition which include the polymer compositions thus formed.

The following definitions apply hereinthroughout unless a contrary intention is expressly indicated:

An "interpolymer" is a polymer comprising mer units derived from two or more different monomers.

DETAILED DESCRIPTION OF THE PREFERRED EMBODIMENTS

A triblock/diblock polymer blend is particularly suited to use in an adhesive composition. The polymer blend preferably includes a styrene-butadiene-styrene elastomer and a styrene butadiene diblock copolymer. These are preferably formed in a single reactor from multiple charges of vinyl aromatic (e.g., styrene) and conjugated diene (e.g., butadiene) monomers, using an anionic, living catalyst system. A chain transfer agent, such as hexamethylene imine or other cyclic or secondary amine, is added partway through the process. The chain transfer agent functions both as a termination agent for the diblock and an initiator for starting another polymer chain.

The process of the present invention is carried out in a suitable solvent, which may be cyclic or aliphatic. In one embodiment, the process of the present invention includes the sequential steps of:

(1) polymerizing a vinyl aromatic monomer A in an inert hydrocarbon solvent, such as cyclohexane in the presence of a suitable live catalyst system until substantially complete conversion to a "living" polymer has occurred;

(2) adding a conjugated diene monomer B, and allowing the conjugated diene monomer to copolymerize with the living vinyl aromatic polymer until substantially complete conversion has occurred;

(3) terminating a portion of the living polymer chains with a chain transfer agent;

(4) adding a second portion of a conjugated diene monomer B', and allowing the conjugated diene monomer to polymerize until substantially complete conversion;

(6) adding a second portion of a vinyl aromatic monomer A', and allowing the vinyl aromatic monomer to polymerize until substantially complete conversion; and (7) quenching the living polymer chains by adding at least one of a functional terminating agent and a protic terminating agent.

By living polymer, it is meant that the polymer is prepared by anionic polymerization and has active terminals (e.g., lithium ion terminals) which enable the polymer to undergo further polymerization reactions or to be terminated through a suitable terminating process.

The functional terminating agent includes a functional group (i.e, a group other than H), which is selected to add functionality to the polymers of the resulting diblock/triblock blend.

The protic terminator removes residual catalyst (lithium, in the case of an organolithium catalyst) from the interpolymers formed, and thereby prevents further reaction of the copolymers. Where both a functional terminating agent and a protic terminating agent are used, the protic terminating agent is preferably used after the functional terminating agent.

After the polymerization has been terminated, the product can be isolated, e.g., by drum drying, steam stripping, or flash evaporation.

By the term "substantially complete conversion," it is meant that the polymerization reaction is allowed to proceed in each step until at least 90%, more preferably, at least 95%, and most preferably, at least 98% of the initially charged monomer has been polymerized. As a result, the blocks are relatively pure (i.e., free of the other monomer(s)).

The process results in a block copolymer composition comprising a triblock copolymer of the general formula $A_1-B_1-B_2-A_2$, and two diblock copolymers of the general formula $A_1-B_1$ and $B_2-A_2$, which may be the same or different, where:

$A_1$ represents a poly(vinyl aromatic block) formed in step 1;

$B_1$ represents a poly(conjugated diene block) formed in step 2;

$B_2$ represents a poly(conjugated diene block) formed in step 4;

$A_2$ represents a poly(vinyl aromatic block) formed in step 5;

$A_1$ and $A_2$ may be formed from the same or different monomers; and $B_1$ and $B_2$ may be formed from the same or different monomers.

The copolymer $A_1-B_1-B_2-A_2$ is termed a triblock because the $B_1$ and $B_2$ blocks are both formed from conjugated diene monomers and thus function as a single conjugated diene midblock, even though the $B_1$ and $B_2$ portions of the block may be formed from different conjugated dienes.

The above described process may be illustrated by the following reaction scheme, where A represents a vinyl aromatic monomer, B represents a conjugated diene monomer, Li represents a living catalyst, C—H represents a chain transfer agent, and T—X represents a terminating agent, such as a protic and/or functional terminating agent, X represents a functional group or hydrogen on the interpolymer derived from the terminating agent added in step (6).

| Step | Add | Products |
|---|---|---|
| (1): | A + Li | $A_1$-Li |
| (2): | B | $A_1$-$B_1$-Li |
| (3): | C-H | $A_1$-$B_1$-Li + $A_1$-$B_1$H + C-Li (new catalyst) |
| (4): | B | $A_1$-$B_1$-$B_2$-Li + $A_1$-$B_1$H + $B_2$-Li |
| (5): | A | $A_1$-$B_1$-$B_2$-$A_2$-Li + $A_1$-$B_1$H + $B_2$-$A_2$-Li |
| (6): | T-X | $A_1$-$B_1$-$B_2$-$A_2$X + $A_1$-$B_1$H + $B_2$-$A_2$X |

In the above reaction scheme, only a portion such as 15 to 80%, preferably about 50 wt. % of the diblock polymer chains are terminated with the chain transfer agent C—H, while the remainder of the chains are terminated by the protic/and or functional terminating agent T—X (replacing the positively charged Li with H or functional group) in step (6).

The conjugated diene block $B_1B_2$ formed in step (5), i.e., the conjugated diene midblock of the triblock, is larger than either of the two butadiene blocks $B_1$ and $B_2$ in the two diblocks.

The vinyl aromatic blocks $A_1$ in the diblock and triblock are substantially identical, as are the two $A_2$ blocks in the diblock and triblock. Specifically, the ratio of the molar weights of the two blocks is preferably from about 0.9 to 1.1, more preferably, 0.095 to 1.05, and most preferably is about equal to 1. Optionally, by using appropriate amounts of the same monomer, the $A_1$ and $A_2$ blocks can be substantially identical also.

The vinyl aromatic monomer can be any one or more of styrene, α-methyl styrene, p-methyl styrene, p-tert-butyl styrene, 1,3, dimethyl styrene, vinyl toluene, and vinyl naphthalene, of which styrene is the most preferred. For example, $A_1$ and $A_2$ may be derived from randomly copolymerized styrene and α-methyl styrene, although both A blocks are preferably homopolymer blocks.

The conjugated diene monomer is preferably one or more of conjugated dienes containing from 4 to 8 carbon atoms, such as 1,3-butadiene, 2-methyl-1, 3-butadiene (isoprene), 2,3-dimethyl-1,3-butadiene, 1,3-pentadiene, 1,3-hexadiene, or mixtures thereof, of which 1,3-butadiene and/or isoprene are preferred. For example, both B blocks may be derived from randomly copolymerized butadiene and isoprene, or one or more blocks of each of butadiene and isoprene although both B blocks are preferably homopolymer blocks.

Polymerization occurs in a suitable solvent, such as an inert hydrocarbon. The inert hydrocarbon solvent may be any known solvent utilized in the polymerization arts. Examples of suitable solvents include linear or branched hydrocarbons, such as n-hexane, octane, and isopentane, cyclic aliphatic hydrocarbons, such as cyclohexane, cycloheptane, and cyclopentane, alone or in a combination of two or more such solvents. Hexane and mixtures of cyclohexane and hexane are particularly preferred solvents.

The functional terminating agent, if used, is selected so as to provide functionality, i.e., impart desirable properties to the resultant interpolymer composition. The interpolymer compositions are particularly suited for use as adhesives, alone or with other components of an adhesive composition. For these uses, functional groups which add desirable adhesive properties are selected. The properties are chosen dependent on the specific end use. For example, one functional group may improve peel adhesion to stainless steel, while another to polypropylene or polyethylene. In this respect, as an example, terminating agents which provide hydroxyl functional groups improve adherence to polyethylene and polypropylene.

On addition of the functional terminator to the interpolymer composition, the living polymer anions on the diblock and triblock interpolymers are provided with a functional group, which, after treatment with the protic terminating agent, results in the desired functional group.

Exemplary functional terminators are shown in TABLE 1, accompanied by the functional group provided in the diblock and triblock polymers.

TABLE 1

| Functional Terminator | Functional Group |
| --- | --- |
| 1. monofunctional epoxy compounds, such as cyclohexene oxide | —OH hydroxyl |
| 2. Alkoxysilanes, such as tetraethoxysilane $Si(OEt)_4$ | Alkoxysilane-$OSi(OAlk)_3$ such as ethoxysilane —$OSi(OEt)_3$ |
| 3. Imines, particularly condensation products of benzaldehydes and amines, such as Schiff Bases, e.g. Dimethylaminobenzilidene butylamine | Amine —NH(R) |
| 4. carbon dioxide $CO_2$ | Carboxyl —COOH |

The protic terminating agent can be one or more commonly known active hydrogen compounds, such as water (e.g., as steam), alcohols, phenols, and carboxylic acids. Examples include boric acid in water, methanol, ethanol, isopropanol, and ethyl hexanoic acid.

The protic terminator may be used as the sole terminating agent, i.e., all living ends of the copolymers are replaced with H. Or, the functional terminating agent may be added in a sufficient quantity (i.e., in less than a stoichiometric amount) to terminate only a portion of the interpolymer chains. For example, 25, 50, or 80% of the interpolymer chains can be terminated with the functional group in step (6), while the remainder are protically terminated in a second step (6a). In this way, the percentage of functionally terminated interpolymer chains can be selected to provide optimal properties of the composition, according to its intended use.

The polymerization process is one which yields a living polymer (i.e., one having a reactive end group) after steps 1–5. The reactive end group is typically a negatively charged end group which forms an ionic bond or other ionic association with a positively charged species, such as a metal cation. A variety of polymerization catalysts are suited to catalyzing steps 1–5, and forming a living polymer. Preferred catalysts are organic alkali metal compounds, particularly organolithium catalysts. The organolithium catalyst may be any organolithium compound which acts as an initiator in polymerization having the general formula RLi, where R is selected from the group consisting of alkyls, cycloalkyls, alkenyls, aryls, and aralkyls having from 1 to about 20 carbon atoms. Exemplary R groups include n-butyl, s-butyl, methyl, ethyl, isopropyl, cyclohexyl, allyl, vinyl, phenyl, benzyl, and the like. Suitable organic compounds of lithium include organolithium or lithium salts of an organic acid, such as alkyl lithium compounds, lithium salts of alcohols, lithium salts of glycol ethers, lithium salts of alcohols, phenols, thioalcohols, and thiophenols, lithium salts of dialkylaminoethanol, lithium salts of secondary amines, lithium salts of cyclic imines, and the like. A preferred class of organolithium compounds is the alkyl lithium compounds, wherein the alkyl group may be a linear alkyl compound or a cycloalkyl group. Preferred organic compounds of lithium include alkyl lithium having 2 to 10 carbon atoms, such as methyl lithium, ethyl lithium, n-propyl lithium, n-butyl lithium, sec-butyl lithium, isoamyllithium, and the like, alone or in combination. Preferred alkyl lithium compounds are n-butyl lithium and sec-butyl lithium, with sec-butyl lithium being particularly preferred. The anionic catalyst may be a combination of two or more catalysts.

The chain transfer agent is one which is capable of both terminating a living polymer, to prevent further polymerization, and forming a new living catalyst which catalyzes the polymerization of further additions of monomers. Suitable chain transfer agents are cyclic amines, such as imines, tertiary amines, and secondary amines. For example, the chain transfer agent may be an alkyl, dialkyl, cycloalkyl or a dicycloalkyl amine having the general formula:

or a cyclic amine having the general formula:

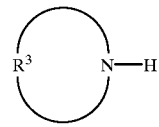

In these formulas, $R^1$ and $R^2$ independently are an alkyl, cycloalkyl or aralkyl having from 1 to about 20 carbon atoms, and $R^3$ is a divalent alkylene, bicycloalkane, substituted alkylene, oxy- or N-alkylamino-alkylene group having from 1 to about 12 carbon atoms.

Exemplary $R^1$ and $R^2$ groups include methyl, ethyl, butyl, octyl, cyclohexyl, 3-phenyl-1-propyl, isobutyl, and the like. Exemplary $R^3$ groups include trimethylene, tetramethylene, hexamethylene, oxydietheylene, N-alkylazadiethylene, and the like.

Exemplary chain transfer agents include pyrrolidine; piperidine; 3-methylpiperdine; piperazine; 4-alkylpiperazine; 4-propylpiperazine; perhydroazepine; 3,3,5-trimethylhexahydroazepine; hexamethyleneimine; 1-azacyclooctane; azacyclotridecane, also known as dodecamethyleneimine; azacycloheptadecane, also known as hexadecamethyleneimine; 1-azacycloheptadec-9-ene; 1-azacycloheptadec-8-ene; and bicyclics such as perhydroisoquinoline, perhydroindole, 1,3,3-trimethyl-6-azabicyclo [3.2.1] octane; and the like.

Other useful examples of chain transfer agents are those that contain alkyl, cycloalkyl, aryl and aralkyl substituents of the cyclic and bicyclic amines, including, but not limited to 2-(2-ethylhexyl)pyrrolidine; 3-(2-propyl)pyrrolidine; 3,5bis(2-ethylhexyl)piperidine; 4-phenylpiperidine; 7-decyl-1-azacyclotridecane; 3,3-dimethyl-1-azacyclotetradecane; 4-dodecyl-1-azacyclooctane; 4-(2-phenylbutyl)-1-azacyclooctane; 3-ethyl-5-cyclohexyl-1-azacycloheptane; 4-hexyl-1-azacycloheptane; 9-isoamyl-1-azacycloheptadecane; 2-methyl-1-azacycloheptadec-9-ene; 3-isobutyl-1-azacylododecane; 2-methyl-7-t-butyl-1-azacylododecane; 5-nonyl-azacyclodecane; 8-(4'methyl phenyl)-5-pentyl-3-azabicyclo[5.4.0]undecane; 1-butyl-6-azabicyclo[3.2.1]octane; 8-ethyl-3 -azabicyclo[3.2.1] octane; 1-propyl-3-azabicyclo[3.2.2]nonane; 3-(t-butyl)-7-azabicyclo[4.3.0]nonane; 1,5,5-trimethyl-3-azabicyclo[4.4.0]decane; and the like.

Preferred chain transfer agents are cyclic amines, such as hexamethylene imine and piperidine, hexamethylene imine being particularly preferred. The chain transfer agent may be a combination of two or more chain transfer agents.

If desired, the polymerization may be carried out in the presence of a polar modifier, such as a Lewis base, e.g., tetrahydrofuran (THF). Examples of other polar compounds are (a) ethers, such as dimethyl ether, diethyl ether, diphenyl ether, dibenzyl ether, and anisole; (b) amines, such as trimethylamine, triethylamine, pyridine, and tetramethyl ethylene diamine; (c) thioethers, such as thiophene; and (d) polyethers, such as 1,2-dimethoxy ethane, glyme, and diglyme.

The polymerization reactions may be carried out at equal or different temperatures within the range of from about −10° C. to 150° C., preferably, 10–110° C. The reaction pressure is not bound to any particular value, but preferably is sufficient to maintain the reaction mixture in the liquid phase.

In step (1) of the reaction scheme provided above, a reactor suited to mixing the polymerization mixture and heating or cooling it is charged with a solvent, such as cyclohexane, the first monomer A, such as styrene, and sufficient organolithium catalyst (such as an organolithium catalyst) to generate polyvinylaromatic (in this case polystyrene) blocks of a desired molecular weight, preferably of the order of 6,000–22,000 weight average molecular weight ($M_w$). A polar modifier, such as THF, is optionally added at this stage to improve uniformity of polymer chain length and/or allow a lower reaction temperature. The styrene may be pre-blended with all or a portion of the solvent to aid mixing.

The reactor can then be heated to an appropriate temperature, preferably about 20–65° C. Once the monomer has been polymerized, or substantially polymerized, the mixture is preferably cooled and, in step (2), the second monomer, a diene, such as butadiene, is added. As with the styrene, the butadiene may be pre-blended with solvent. The temperature is then raised to about 55–100° C. and the polymerization allowed to proceed until substantially all the butadiene has polymerized with the living styrene polymers.

In step (3), a chain transfer agent is added in a sufficient amount to protically or otherwise terminate at least a portion of the living AB polymer. In the process, a new catalyst is formed from the chain transfer agent and the living end group split from the living AB polymer, e.g., a N-lithio salt of hexamethyleneimine in the case of an alkyl lithium catalyst and a hexamethyleneimine chain transfer agent. This catalyst functions as a living catalyst and is able to catalyze the formation of new polymers as further additions of monomers are made (steps (4) and (5)).

In step (4) a further addition of monomer B (e.g., butadiene) is added and the reactor is heated to an appropriate temperature, preferably about 55–100° C. The polymerization is allowed to proceed until substantially all the butadiene has polymerized, either with the living styrenebutadiene interpolymers or with the newly formed living catalyst. No further addition of catalyst is needed in step (4).

In step (5) a further addition of the A monomer is made to complete the triblock and diblock copolymers. No further addition of catalyst is needed in step (5), unless it is desired to continue the reaction scheme to form a mixture of diblock, triblock, and 4-, or more-block interpolymers. Further monomer additions can be performed, if desired, to produce multiblock polymers, with or without additional charges of catalyst. For diblock/triblock compositions, however, the reaction is preferably quenched, in step (6), by addition of a functional/protic terminator at this stage to functionally/protically terminate the diblock and triblock interpolymers.

Further steps may be included, such as the addition of an antioxidant or stabilizer to the composition. Exemplary stabilizers or antioxidants include high molecular weight hindered phenols, such as S- and P-containing phenols. Representative hindered phenols include 1,3,5-trimethyl, 2,4-tris(3,5-di-tertbutyl-4-hydroxybenzyl)benzene; pentaerythrityl tetrakis-3-tris(3,5-di-tertbutyl-4-hydroxybenzyl) propionate, and the like.

In an alternative embodiment, partial functional termination is used in combination with further additions of monomers. A functional terminator, such as cyclohexene oxide can be added to the polymerization mixture after step (5). An additional charge or charges of one or more of the monomers is then added to the polymerization mixture. This provides a mixture of di and triblock functionally terminated interpolymers, together with multiblock polymers which may be longer than the di and triblock interpolymers (depending on whether additional catalyst charges are added) and may be functionally or protically terminated.

As indicated above, the process of the present invention is not limited to diblock and triblock compositions. The process can be extended, between steps 2 and 3 or 4–5, to add further charges of one or more monomers.

The vinyl aromatic content of the triblock and diblock copolymers may vary over a wide range. For adhesive formulations, the vinyl aromatic content is preferably not too high, i.e., does not exceed 55% by weight, based on the total weight of the block copolymer. More particularly, the vinyl aromatic content of both diblock and triblock copolymers is preferably from 10–50% by weight, more preferably, from 12–40% by weight, and, most preferably, from 14–35% by weight, although higher or lower vinyl aromatic content may be desirable for some applications.

The molecular weight ($M_w$) of the vinyl aromatic blocks is not bound to specific values, but may suitably be from 5,000 to 30,000, preferably 12,000 to 21,000. The butadiene blocks ($B_1$, $B_2$) have a preferred $M_w$ of 17,000–43,000. The apparent molecular weight of the triblock copolymer may suitably be from 50,000 to 400,000, preferably, 60,000 to 120,000. Molecular weights, throughout the specification, are as measured by gel permeation chromatography (GPC) using polystyrene calibration standards.

In another embodiment, the process is used to form a block copolymer composition including block copolymers formed in a solvent in which the poly [vinyl aromatic] polymer, e.g., polystyrene, is poorly soluble, e.g., an aliphatic solvent, such as hexane.

In this embodiment, a small amount of a poly[conjugated diene], such as polybutadiene, is formed first. This acts as a dispersant for the poly [vinyl aromatic]polymer, formed in a second step. The reaction scheme thus may proceed as follows, using the same letters as above to represent the various components and the letter b to represent a small amount of conjugated diene or conjugated diene polymer block:

| Step | Add | Products |
|---|---|---|
| (1a) | b + Li | b-Li |
| (1b): | A + Li | b-$A_1$-Li + $A_1$-Li |
| (2): | B | b-$A_1$-$B_1$-Li + $A_1$-$B_1$-Li |
| (3): | C-H | b$A_1$-$B_1$-Li + b$A_1$-$B_1$H + $A_1$-$B_1$-Li + $A_1$-$B_1$-H + C-Li (new catalyst) |

-continued

| Step | Add | Products |
|---|---|---|
| (4): | B | $bA_1$-$B_1$-$B_2$-Li + $bA_1$-$B_1$H + $A_1$-$B_1$-$B_2$-Li + $A_1$-$B_1$-H + $B_2$-Li |
| (5): | A | $bA_1$-$B_1$-$B_2$-$A_2$-Li + $bA_1$-$B_1$H + $A_1$-$B_1$-$B_2$-$A_2$-Li + $A_1$-$B_1$-H + $B_2$-$A_2$-Li |
| (6): | T-X | $bA_1$-$B_1$-$B_2$-$A_2$X + $bA_1$-$B_1$H + $A_1$-$B_1$-$B_2$-$A_2$X + $A_1$-$B_1$-H + $B_2$-$A_2$X + TLi (inactive) |

Steps 2–6 are essentially the same as previously described. Step 1, however now comprises two steps, step 1a; resulting in the formation of a small amount of poly[conjugated diene], and step 1; adding the same ingredients as step 1) of the prior embodiment to form poly[vinyl aromatic]. Only a small amount of poly [conjugated diene] is needed to disperse the poly [vinyl aromatic]polymer. Thus, step (1a), in this embodiment, includes charging only a small proportion of conjugated diene monomer, such as butadiene, preferably less than about 10%, more preferably, around 5% of the total conjugated diene monomer, and a portion of the catalyst, preferably, about one third of the total catalyst charge, to generate a small amount of b-Li, e.g, polybutadiene of relatively low molecular weight. Preferably, the molecular weight of the polybutadiene is of the order of about 4500.

The polybutadiene is generated in a sufficient amount to disperse the vinyl aromatic monomer A added in step (1b). Preferably, sufficient vinyl aromatic monomer and enough catalyst are added in step (1b) to ensure that the styrene blocks of the resulting copolymers are of equivalent molecular weight. Because of the small amount of b-Li generated in step (1a), step (1b) results in the formation of a small amount of b-$A_1$—Li and a larger amount of $A_1$—Li, e.g., polystyrene.

Similarly, step (2) results in the formation of a small amount of b-$A_1$—$B_1$—Li and a larger amount of $A_1$—$B_1$—Li, corresponding to the amounts of b-$A_1$—Li and $A_1$—Li produced in step (1b). Step (3) results in formation of small amounts of $bA_1$—$B_1$—Li and $bA_1$—$B_1$H and larger amounts of $A_1$—$B_1$—Li and $A_1$—$B_1$—H. As a result, the final mixture formed in step (6) is primarily formed from the triblock $A_1$—$B_1$—$B_2$—$A_2$X, and the two diblocks, $A_1$—$B_1$—H, and $B_2$—$A_2$X, as for the first embodiment, with only small amounts of $bA_1$—$B_1$—$B_2$—$A_2$X and $bA_1$—$B_1$H. Thus, the overall properties of the copolymer composition are primarily dependent on the $A_1$—$B_1$—$B_2$—$A_2$X, $A_1$—$B_1$—H, and $B_2$—$A_2$X copolymers. Additionally, while $bA_1$—$B_1$H and $bA_1$—$B_1$—$B_2$—$A_2$X are actually tri- and four-block copolymers, respectively, they tend to function as di- and tri-blocks, respectively, because of the small amount of diene monomer b present.

As for the prior embodiment, step (6) protically and/or functionally terminates the living copolymers, stopping further reaction.

The $A_1$—$B_1$H and $B_2$—$A_2$X can be substantially the same (i.e, derived from the same monomers, of similar molecular weight, and similarly terminated), or be different, either in monomer composition, average molecular weight, or termination (H or X).

The present invention also relates to a block copolymer composition comprising:

(1) a triblock copolymer $B_1$—$A_1$—$A_2$—$B_2$ having two different or equal polymer end blocks $B_1$, $B_2$ derived from conjugated diene monomer, and one polymer midblock $A_1$—$A_2$ derived from vinyl aromatic monomer; and (2) a diblock polymer $A_2$—$B_2$ having one polymer block $A_2$ derived from vinyl aromatic monomer and one polymer block $B_2$ derived from conjugated diene monomer.

The process for forming the composition is the same as that described above, except in that conjugated diene monomer is charged in place of vinyl aromatic monomer, and vice versa.

The compositions of the present invention are suited to incorporation into adhesive compositions, into asphalt compositions, and for a variety of other uses.

To form an adhesive composition, the diblock/triblock composition may be combined with a variety of tackifying resins, plasticizing oils, waxes, stabilizers, and the like. Exemplary tackifying resins include hydrocarbon resins, synthetic polyterpenes, rosin esters, natural terpenes, and the like. Examples include natural and modified rosins, such as gum rosin, wood rosin, hydrogenated rosin; glycerol and pentaerythrol esters of natural and modified rosins; copolymers and terpolymers of natural terpenes, e.g., styrene/terpene; polyterpene resins; phenolic modified terpene resins and hydrogenated derivatives thereof; aliphatic petroleum hydrocarbon resins having a Ball and Ring softening point of from about 70–135° C.; aromatic petroleum hydrocarbon resins and hydrogenated derivatives thereof; and alicyclic petroleum hydrocarbon resins and hydrogenated derivatives thereof.

Exemplary stabilizers or antioxidants include high molecular weight hindered phenols, such as sulfur and phosphorus containing phenols. Representative hindered phenols include 1,3,5-trimethyl, 2,4-tris(3,5-di-tertbutyl-4-hydroxybenzyl)benzene; pentaerythrityl tetrakis-3-tris(3,5-di-tertbutyl-4-hydroxybenzyl)propionate, and the like.

Plasticizing oils are preferably present in the adhesive composition to provide wetting action and/or viscosity control. Exemplary plasticizing oils include not only the usual plasticizing oils, but also olefin oligomers and low molecular weight polymers as well as vegetable and animal oils, and their derivatives.

Various petroleum derived waxes may be used in order to impart fluidity in the molten condition to the adhesive and flexibility to the set adhesive. Exemplary waxes include paraffin and microcrystalline waxes having a melting point within the range of about 55–110° C., as well as synthetic waxes, such as low molecular weight polyethylene or Fischer-Tropsch waxes.

For example, a hot melt adhesive may be formed as follows:

(a) 15–40% by weight of a diblock/triblock composition, preferably comprising functionally or protically terminated $A_1$—$B_1$—$B_2$—$A_2$X, $A_1$—$B_1$H, and $B_2$—$A_2$X blocks, as described above;

(b) 40–70% of a compatible tackifying resin;

(c) 5 to 30% by weight of a plasticizing oil;

(d) 0 to 5% by weight of a petroleum derived wax; and (e) 0.1 to 2% by weight of a stabilizer.

The invention is further illustrated by the following examples, without intending to limit the scope of the invention.

EXAMPLES

Example 1

Preparation of a Diblock/Triblock Composition from Styrene and Butadiene using Hexamethyleneimine Chain Transfer Agent A reactor fitted with a stirrer and heating/cooling jacket was charged with 10.0 kg hexane, 0.31 kg of a blend of 30.0% butadiene in hexane, 45.6 g of butyl lithium catalyst (3% in hexane), and 2.0 g of a 15% solution in hexane THF/oligomeric oxylanolpropane polar modifier, sold by Firestone Polymers (Akron, Ohio) under the tradename Oops™. The batch temperature was set at 77° C. and heated for 30 minutes. The polymerization mixture was cooled to a temperature of 54° C. A second charge of 92.5 g butyl lithium catalyst (3% in hexane), was added, and then 2.08 kg of a blend of 33.0% styrene in hexane was added, as quickly as possible. The batch temperature was set to 54° C. and the reaction allowed to proceed for a further 30 minutes, after reaching the peak. A sample of the polymerization mixture was taken into a clean, $N_2$-purged bottle for analysis.

The reactor was then charged with a further 3.76 kg of the blend of 33.0% butadiene in hexane, as quickly as possible. The batch temperature was set to 77° C. and the reaction allowed peak (77° C.). The reaction was allowed to proceed for a further thirty minutes, after reaching the peak. Then, 2.06 g of hexamethylene imine was added. This amount was sufficient to terminate about 33% of the polymer chains, leaving about 67% of the polymer chains still alive and able to copolymerize.

After a further five minutes, a further 2.72 kg of a blend of 30.0% butadiene in hexane was added to the reactor. Thirty minutes after charging was complete, a further 1.36 kg of a blend of 33.0% styrene in hexane was added to the reactor.

After a further 30 minutes, cooling of the jacket was started. The polymerization mixture was transferred to a holding tank to reduce the temperature quickly. Then, 1 g of a protic terminator, boric acid and 31.8 g of water was added to convert any remaining lithium in the interpolymers to LiOH. 25.4 g of an antioxidant, tris-nonyl phenyl phosphate and 7.9 g of Irganox 1076, available from Ciba Grigy, were added to the polymerization mixture and agitated.

The product was drum dried to remove the solvent. The product comprised 36% styrene, 64% butadiene. The vinyl content of the product was about 11.38%, and the molecular weight, ($M_w$) 61,404.

Example 2

Preparation of a Diblock/Triblock Composition from Styrene and Butadiene using Hexamethyleneimine Chain Transfer Agent The method of Example 1 was repeated.

Example 3

Preparation of a Diblock/Triblock Composition from Styrene and Butadiene using Hexamethyleneimine Chain Transfer Agent The method of Example 1 was repeated.

Example 4–6

The properties of the product of Examples 1–3 were compared with those of other diblock/triblock formulations, as follows:

Example 4

Preparation of a Diblock/Triblock Formed by Partial Termination

A reactor fitted with a stirrer and heating/cooling jacket was charged with 10.06 kg hexane, 0.27 kg of a blend of 33.0% butadiene in hexane, 45.4 g of butyl lithium catalyst, and 2.0 g of a tetrahydrofuran/oligomeric oxylanolpropane polar modifier, sold under the tradename Oops™. The batch temperature was set at 77° C. and heated for thirty minutes. The polymerization mixture was cooled to a temperature of 32° C. A second charge of butyl lithium 92.1 g, was added, and then 2.31 kg of a blend of 33.0% styrene in hexane was added, as quickly as possible. The batch temperature was set to 54° C. and the reaction allowed to proceed for a further thirty minutes, after reaching the peak. A sample of the polymerization mixture was taken into a clean, nitrogen purged bottle for analysis.

The reactor was then charged with a further 5.85 kg of the blend of 33.0% butadiene in hexane, as quickly as possible. The batch temperature was set to 77° C. and the reaction allowed to proceed for a further thirty minutes, after reaching the peak. Then, isopropanol, a protic terminator, was added to terminate about 50% of the catalyst, leaving about half of the polymer chains still able to copolymerize.

After a further five minutes, a further 1.13 kg of a blend of 33.0% styrene in hexane was added to the reactor.

After a further 30 minutes, cooling of the jacket was started. The polymerization mixture was transferred to a holding tank to reduce the temperature quickly. Then, additional isopropanol was added to convert any remaining lithium in the interpolymers to LiOH. 25.4 g of an antioxidant, tris-nonyl phenyl phosphate was added to the polymerization mixture and 7.9 g of Irganox 1076 and agitated.

The product was drum dried to remove the solvent.

Example 5

Preparation of a Diblock/Triblock Composition from Styrene and Butadiene (Control)

The process of Example 4 was used to prepare a triblock composition, although in this case, no functional terminating agent was used.

Example 6

Preparation of a Diblock/Triblock Composition from Styrene and Butadiene via Multiple Catalyst Charges The process of Example 4 was used to prepare a diblock/triblock composition, although in this case, the catalyst charge which accompanied the first addition of styrene was adjusted to ensure that the styrene blocks were of equivalent molecular weight and the weight percent of the diblock in the interpolymer composition was about 50.

Example 7

Preparation of a Diblock/Triblock Composition from Styrene and Butadiene Via Blending a Diblock and a Triblock The process was similar to Example 4, except that a diblock of butadiene and styrene was separately prepared and charged to the reactor with the initial hexane, styrene, butyl lithium catalyst, and polar modifier. The diblock was used in about 50 weight percent of the interpolymer composition.

Example 8

Evaluation of Compositions Formed in Examples 1–7

The resulting interpolymer compositions prepared in Examples 1–7 and a sample of Stereon 840™ (a styrene butadiene multiblock polymer with 43% styrene and an MFR of 12, available from Firestone Polymers) were then subjected to a variety of analytical tests, as follows:

Pressure Sensitive Adhesive (PSA) Tests

For these tests the composition was dissolved in toluene and cast on to mylar to produce a tape.

Viscosity (with solvent removal), cPs, was measured at four different temperatures, 149° C., 163° C., 177° C. and 204° C, according to ASTM D2196.

Quick Stick, oz/in, was measured according to Pressure Sensitive Tape Council method PSTC-5.

Peel Adhesion, g/cm, was measured on three different substrates, stainless steel, polyethylene, and polypropylene, according to PSTC-1 (ASTM D3330).

SAFT, ° C., was measured according to ASTM D4498.

Polyken Tack, g, was measured according to ASTM D2979.

Rolling Ball, cm, was measured according to PSTC-6 (ASTM D3121).

Coating Weight was measured by coating a sheet of Mylar™ (DuPont) of known weight/unit area with the composition, weighing a known area, and deducting the weight of Mylar in the sample.

Hot Melt Adhesive Tests

These tests were carried out on the composition in the form of a hot melt adhesive.

Adhesive Tensile was determined by pouring the composition into a mold and allowing it to cool. The specimen is removed from the mold and subjected to standard tensile tests at room temperature. Viscosity, cPs, was measured at four different temperatures, 149° C., 163° C., 177° C. and 204° C., according to ASTM D 2196.

Gardner Color was measured according to ASTM D1544.

The results of these tests are provided in TABLE 2. Molecular weights for these compositions, and % styrene, % block styrene, % vinyl butadiene, and % melt indexes are recorded in TABLE 3. Melt index was determined according to ASTM D1238 (MFR 200/5.0 (200° C., 5 kg)).

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

TABLE 2

| | Sample | | | | | | | |
|---|---|---|---|---|---|---|---|---|
| | S-840A | 1 | 2 | 3 | 4 | 5 | 6 | 7 |
| PSA RESULTS | | | | | | | | |
| VISCOSITY, cPs | | | | | | | | |
| @ 149° C. | 2538 | 2165 | 4050 | 3345 | 3475 | 4225 | 3588 | 2930 |
| @ 163° C. | 1600 | 1315 | 2495 | 2100 | 2120 | 2675 | 2240 | 1825 |
| @ 177° C. | 1065 | 878 | 1650 | 1385 | 1400 | 1745 | 1495 | 1208 |
| @ 204° C. | 542 | 440 | 805 | 688 | 695 | 858 | 720 | 568 |
| Quick Stick, g/cm | 382 | 858 | 894 | 771 | 820 | 666 | 914 | 689 |
| PEEL ADHESION, g/cm | | | | | | | | |
| Stainless steel | 1229 | 1165 | 1156 | 1247 | 1127 | 1377 | 1047 | 1262 |
| Polyethylene | 147 | 320 | 277 | 357 | 271 | 208 | 425 | 257 |
| Polypropylene | 997 | 1045 | 979 | 798 | 940 | 388 | 942 | 843 |
| SAFT, ° C. | 58 | 48 | 62 | 54 | 56 | 114 | 60 | 57 |
| Polyken Tack, g | >1000 | >1000 | >1000 | >1000 | 966 | >1000 | >1000 | >1000 |
| Rolling ball, cm | >10 | >10 | >10 | >10 | >10 | >10 | >10 | >10 |
| Coating Weight | .2642 | .2679 | .2616 | .2616 | .2718 | .2940 | .2650 | .2897 |
| HMA RESULTS | | | | | | | | |
| VISCOSITY, cPs | | | | | | | | |
| @ 300° F. | 2785 | 2065 | 2985 | 2720 | 3195 | 3688 | 3110 | 2790 |
| @ 325° F. | 1720 | 1275 | 1880 | 1705 | 1975 | 2310 | 1915 | 1725 |
| @ 350° F. | 1108 | 850 | 1268 | 1140 | 1290 | 1520 | 1260 | 1145 |
| @ 400° F. | 552 | 425 | 638 | 570 | 638 | 745 | 640 | 565 |
| Gardner Color | 2 | 3 | 3 | 3 | 2 | 2 | 4 | 4 |
| Adhesive Tensile, kg/sq. cm | 7.65 | 4.21 | 6.80 | 6.63 | 5.11 | 7.90 | 3.31 | 4.12 |

TABLE 3

| Example | Process | Total Molecular Weight | | | Block Styrene Molecular Weight | | | Styrene % | Block Styrene % | Vinyl Butadiene % | Melt Index (Cond. G) |
|---|---|---|---|---|---|---|---|---|---|---|---|
| | | Mn | Mw | Mw/Mn | Mn | Mw | Mw/Mn | | | | |
| 1 | Chain Transfer | 42,890 | 61,410 | 1.43 | 13,890 | 21,940 | 1.58 | 36.0 | 36.8 | 11.6 | 38.5 |
| 2 | Chain Transfer | 49,590 | 82,570 | 1.66 | 15,690 | 19,800 | 1.26 | 38.0 | 39.4 | 11.1 | 4.0 |

TABLE 3-continued

| | | Total Molecular Weight | | | Block Styrene Molecular Weight | | | Styrene | Block Styrene | Vinyl Butadiene | Melt Index |
|---|---|---|---|---|---|---|---|---|---|---|---|
| Example | Process | Mn | Mw | Mw/Mn | Mn | Mw | Mw/Mn | % | % | % | (Cond. G) |
| 3 | Chain Transfer | 50,890 | 71,280 | 1.4 | 13,740 | 18,280 | 1.33 | 36.4 | 38.5 | 9.9 | 13.1 |
| 4 | Partial termination | 54,540 | 72,710 | 1.33 | 14,810 | 21,440 | 1.45 | 35.7 | 42.5 | 11.1 | 11.6 |
| 5 | Control | 57,840 | 78,360 | 1.36 | 12,780 | 15,940 | 1.25 | 36.7 | 37.3 | 12.7 | 5.9 |
| 6 | Multiple catalyst charge | 65,560 | 75,680 | 1.15 | 17,360 | 24,120 | 1.39 | 34.9 | 36.8 | 14.2 | 6.2 |
| 7 | Diblock/ triblock blend | 66,120 | 74,450 | 1.13 | 13,680 | 17,440 | 1.28 | 38.3 | 26.8 | 22.4 | 8.0 |

Having thus described the preferred embodiment, the invention is now claimed to be:

1. A process for preparing a polymer composition which includes diblock and triblock copolymers comprising:

a) polymerizing vinyl aromatic monomer in an inert hydrocarbon solvent in the presence of a first anionic catalyst system until substantially complete conversion to a living vinyl aromatic polymer;

b) adding a conjugated diene monomer and allowing copolymerization with the living vinyl aromatic polymer to form a living diblock polymer comprising a first block which substantially comprises the first vinyl aromatic polymer and a second block which substantially comprises a conjugated diene polymer;

c) adding a chain transfer agent which terminates at least a portion of the living diblock polymer and forms a second anionic catalyst system;

d) adding a conjugated diene monomer, the conjugated diene monomer copolymerizing with the unterminated living portion of the diblock polymer and self polymerizing with the second anionic catalyst to form a living polymer; and e) adding a vinyl aromatic monomer, the vinyl aromatic monomer copolymerizing with the product of step d) to form the diblock and triblock copolymers.

2. The process of claim 1, further comprising, after step e):

adding a terminating agent which terminates the living polymers.

3. The process of claim 1, wherein the chain transfer agent comprises one or more of cyclic amines, tertiary amines, and secondary amines.

4. The process of claim 3, wherein the chain transfer agent includes a cyclic amine comprising one or more of:

(1) amines having the general formula:

where $R^1$ and $R^2$ independently are an alkyl, cycloalkyl or aralkyl having from 1 to about 20 carbon atoms, and (2) cyclic amines having the general formula:

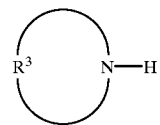

where $R^3$ is a divalent alkylene, bycycloalkane, substituted alkylene, oxy- or N-alkylamino-alkylene group having from 1 to about 12 carbon atoms.

5. The process of claim 4, wherein: (1) $R^1$ and $R^2$ independently are methyl, ethyl, butyl, octyl, cyclohexyl, 3-phenyl-1-propyl, or isobutyl; or (2) $R^3$ is selected from the group consisting of trimethylene, tetramethylene, hexamethylene, oxydietheylene, N-alkylazadiethylene, and combinations thereof.

6. The process of claim 5, wherein the chain transfer agent includes one or more of pyrrolidine; piperidine; 3-methylpiperdine; piperazine; 4-alkylpiperazine; 4-propylpiperazine; perhydroazepine; 3,3,5-trimethylhexahydroazepine; hexamethyleneimine; 1-azacyclooctane; azacyclotridecane; azacycloheptadecane; hexadecamethyleneimine; 1-azacycloheptadec-9-ene; 1-azacycloheptadec-8-ene; perhydroisoquinoline; perhydroindole; and 1,3,3-trimethyl-6-azabicyclo[3.2.1]octane.

7. The process of claim 6, wherein the chain transfer agent includes hexamethylene imine.

8. The process of claim 1, wherein the anionic catalyst system includes an organolithium compound.

9. The process of claim 1, wherein the conjugated diene monomer includes a conjugated diene containing from 4 to 8 carbon comprising one or more of 1,3-butadiene, 2-methyl-1,3-butadiene, 2,3-dimethyl-1,3-butadiene, 1,3-pentadiene, and 1,3-hexadiene.

10. The process of claim 1, wherein the vinyl aromatic monomer includes one or more of styrene, α-methyl styrene, p-methyl styrene, p-tert-butyl styrene, and 1,3, dimethyl styrene.

11. The process of claim 2, wherein the terminating agent is at least one of a protic terminating agent and a functional terminating agent.

12. The process of claim 11, wherein the terminating agent includes a functional terminating agent comprising one or more of monofunctional epoxy compounds, alkoxysilanes, imines, and carbon dioxide.

13. The process of claim 11, wherein the terminating agent includes a functional terminating agent which provides the diblock polymer with a functional group comprising one or more of hydroxyl, alkoxysilane, amine, and carboxyl.

14. The method of claim 1, wherein steps a)–d) are carried out in a single reaction vessel.

15. The process of claim 1, further including, prior to step (a):

(f) polymerizing conjugated diene monomer in an inert hydrocarbon solvent in the presence of a catalyst system until substantially complete conversion to a diene polymer occurs, the diene polymer being present in sufficient amount to solubilize the living vinyl aromatic polymer formed in step (a).

16. The process of claim 15, wherein the conjugated diene monomer used in step (f) amounts to less than about ten percent of a total of the conjugated diene monomers used in the process.

17. The process of claim 15, wherein the solvent includes hexane.

18. The process of claim 15, wherein the catalyst used in step (f) is an anionic catalyst system and amounts to less than about one third of the total of the anionic catalyst system used in the process.

19. A process of forming a composition which includes a diblock polymer and a triblock polymer comprising:

a) polymerizing a first monomer in a suitable solvent in the presence of a first anionic catalyst system;

b) adding a second monomer and allowing copolymerization with the first monomer to form a living diblock polymer;

c) adding a chain transfer agent in sufficient amount to terminate only a portion of the living diblock polymer to form the diblock polymer and form a second anionic catalyst system capable of catalyzing polymerization of the second monomer;

d) adding a second portion of the second monomer and allowing copolymerization with the living diblock polymer and with the second ionic catalyst system; and e) adding a second portion of the first monomer, to form the triblock polymer.

20. An adhesive composition comprising:

15–40% by weight of the polymer composition formed by the process of claim 1 or claim 19;

40–70% by weight of a compatible tackifying resin; and

5–30% by weight of a plasticizing oil.

* * * * *